United States Patent
Sielken et al.

(10) Patent No.: US 9,531,660 B2
(45) Date of Patent: *Dec. 27, 2016

(54) DYNAMIC ENCODING OF EMAIL ADDRESSES

(75) Inventors: Robert Selby Sielken, Chapel Hill, NC (US); William Carleton Wimer, II, Cary, NC (US); David Laverne Zanter, Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1197 days.

This patent is subject to a terminal disclaimer.

(21) Appl. No.: 13/166,897

(22) Filed: Jun. 23, 2011

(65) Prior Publication Data

US 2012/0331062 A1  Dec. 27, 2012

(51) Int. Cl.
*G06F 15/16* (2006.01)
*H04L 12/58* (2006.01)

(52) U.S. Cl.
CPC .................................... *H04L 51/28* (2013.01)

(58) Field of Classification Search
CPC ...................................................... H04L 51/28
USPC ......................................................... 709/206
See application file for complete search history.

(56) References Cited

U.S. PATENT DOCUMENTS

| | | | |
|---|---|---|---|
| 6,292,770 B1 | 9/2001 | Zerber | |
| 7,844,672 B2 | 11/2010 | Zanter | |
| 2002/0120689 A1 | 8/2002 | Kang | |
| 2007/0050454 A1* | 3/2007 | Zanter | 709/206 |
| 2007/0260693 A1* | 11/2007 | Cardone et al. | 709/206 |
| 2007/0282958 A1* | 12/2007 | Erikawa et al. | 709/206 |
| 2008/0235330 A1* | 9/2008 | Cardone et al. | 709/203 |
| 2010/0324987 A1* | 12/2010 | Benisti et al. | 705/14.39 |
| 2011/0314109 A1* | 12/2011 | Bayles et al. | 709/206 |

FOREIGN PATENT DOCUMENTS

WO    2009111870    9/2009

* cited by examiner

*Primary Examiner* — Abdullahi E Salad
(74) *Attorney, Agent, or Firm* — Brian J. Teague

(57) ABSTRACT

Embodiments of the invention may provide the ability to convert a non-supported email address (i.e., an email address that conforms to a standard that is not supported by the receiving device) into a supported email address (e.g., an email address that conforms to a standard that is supported by the receiving device). Embodiments of the invention may perform this conversion, for example, when an email communication containing a non-internet-standard email address is to be delivered or synchronized to a mobile device that only supports standard internet addresses. Similarly, embodiments of the invention may perform this conversion when a calendar entry, a task, a contact, or other data package containing such a non-supported email address is to be delivered or synchronized to a mobile device that does not support such an email address.

12 Claims, 1 Drawing Sheet

DYNAMIC ENCODING OF EMAIL ADDRESSES

BACKGROUND

The present invention relates to the field of electronic communications and addressing of electronic communications.

Electronic communications, such as email communication, may originate from or be received by many different systems which may adhere to many different standards, protocols, or formats. One set of addressing standards for internet email is defined by RFC2822 published by the Internet Engineering Task Force, but there are many other addressing formats that exist and that may be used. For example, Lotus Domino by IBM Corporation uses an addressing format of the form "First Last/City/State/Country" which is not a valid internet address. Additionally, Lotus Domino addresses may contain characters which are not permitted by RFC2822, such as double byte language (Japanese, Korean, etc.) characters and other single byte characters. Email address groups may have just a group name that may not be a valid internet address.

Mobile client devices (mobile phones, smart phones, tablet computers, etc.) may be used to send, receive, and manage email, contacts, calendars, and other data. Such data may be synchronized with a server or other computer to enable the data on the mobile device to mirror that of the server or other computer. While some servers may support non-internet addresses (such as a Lotus Domino server), some types, brands, and/or models of mobile devices may support only internet addresses and may discard any other address formats as invalid data.

BRIEF SUMMARY

In one embodiment of the invention, a method for dynamic encoding of email addresses comprises determining if a data package contains an address that is not supported by a device to receive or synchronize with the data package; if the data package contains an address that is not supported by the device to receive or synchronize with the data package, creating a supported address corresponding to the non-supported address, the supported address comprising a local-part and a domain, the local-part comprising an encoded version of the non-supported address, the domain comprising a non-valid domain; and replacing the non-supported address in the data package with the created supported address.

The created supported address may further comprise a display name part containing a non-encoded version of the non-supported address. The non-valid domain may comprise a domain that is not present in a domain name system.

In addition to the method for dynamic encoding of email addresses, as described above, other aspects of the present invention are directed to corresponding systems and computer program products for dynamic encoding of email addresses.

In addition to the method, system, and computer program product for dynamic encoding of email addresses, other aspects of the present invention are directed to corresponding methods, systems, and computer program products for dynamic decoding of email addresses.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Embodiments of the invention may provide the ability to convert a non-supported email address (i.e., an email address that conforms to a standard that is not supported by the receiving device or fails to conform to any standard) into a supported email address (e.g., an email address that conforms to a standard that is supported by the receiving device). Embodiments of the invention may perform this conversion, for example, when an email communication containing a non-internet-standard email address is to be delivered or synchronized to a mobile device that only supports standard internet addresses. Similarly, embodiments of the invention may perform this conversion when a calendar entry, a task, a contact, or other data packages containing such a non-supported email address is to be delivered or synchronized to a mobile device that does not support such an email address.

Figure 1:
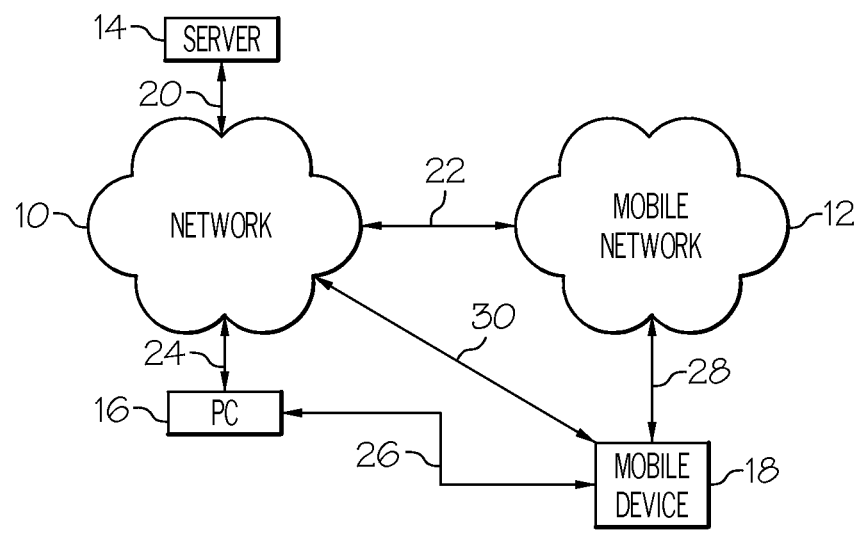
FIG. 1 is a schematic block diagram of a network in which embodiments of the invention may operate.

FIG. 1 is a schematic block diagram of a system in which embodiments of the present invention may operate. The system of FIG. 1 may enable electronic messages (e.g., email messages) or other data packages (including but not limited to PIM data such as calendar data, task data, contact data, etc.) to be sent over communications network 10 to and/or from server 14 (over communication link 20), computer 16 (over communication link 24), and/or mobile device 18. Email messages or other data may be sent to and/or from mobile device 18 from, for example, devices such as server 14 and/or computer 16. Such email messages or other data packages may be sent via communications network 10 to mobile network 12 (via communication link 22), and then from mobile network 12 to mobile device 18 (over communication link 28). Additionally or alternatively, email messages and/or other data packages (e.g., calendar data, task data, contact data, etc.) may be sent via communications network 10 directly to mobile network 12 (via communication link 30). Yet further additionally or alternatively, email messages and/or other data may be synchronized between computer 16 and mobile device 18 over synchronization link 26.

Computer 16 and server 14 provide processing, storage, and input/output devices executing application programs and the like. Communications network 10 can be part of the Internet, a worldwide collection of computers, networks, and gateways that currently use the TCP/IP suite of protocols to communicate with one another. The Internet provides a backbone of high-speed data communication lines between major nodes or host computers, comprising thousands of commercial, government, educational, and other computer networks, that route data and messages. However, computer 16 and server 14 may be linked over any suitable communication network. Mobile network 12 may be any suitable mobile communications/data architecture (such as a mobile telecommunications network adhering to the International Mobile Telecommunications-2000 (also termed 3G) or IMT-Advanced (also termed 4G) standards), in which a mobile telecommunications device (e.g., cell/mobile telephone such as mobile device 18) communicates.

A standard internet email address (such as one conforming to RFC2822) may comprise three parts: a display name, a local-part, and a domain. For example, a standard email address may be "John Smith"<jsmith@acme.com>, in which "John Smith" is the display name, jsmith is the local-part, and acme.com is the domain. An email address that contained such an email address would typically be handled with no problems by any of server 14, computer 16, or mobile device 18.

An example non-standard email address, such as may be used by Lotus Domino, may be öt/ACME, which does not conform to RFC2822 because of the non-allowed character (the "o" with the umlaut) and because it does not have the required components (i.e., a local-part and a standard domain, separated by "@"). Another example non-standard email address, such as may be used by Lotus Domino, may be test user1/ACME@ACME, which does not conform to RFC2822 because it does not have the required components (i.e., a local-part and a standard domain, separated by "@") and because it includes a space between "test" and "user.".

If either of the above non-standard addresses were included (e.g., as the sender's address or the recipient's address) in an email message or other data package that was either sent to or synchronized to a mobile device which only supported standard addresses, the mobile device would likely improperly handle or simply discard the email address. This problem also exists for email recipient group names that may not conform to a standard such as RFC2822.

When a non-standard email address or group (such as an email address containing a character that is not valid in RFC2822) needs to be transmitted or synchronized to a mobile device that only supports standard internet addresses, embodiments of the invention may convert the non-standard address into a standard, valid internet address. This conversion may be performed by an email server (such as server 14 of FIG. 1), by a computer that is originating the email message (such as computer 16), or by the mobile device receiving the email message (such as mobile device 18). If the conversion is done by a server or computer which is sending or synchronizing the email message (or other data package) to the mobile device, such conversion may be performed before sending or synchronizing the email message (or other data package) to the mobile device. If the conversion is done by the mobile device, such conversion may need to be performed by a software algorithm that converts the address prior to sending the message to whichever mobile device application requires a standard address.

Embodiments of the invention may determine if an electronic message or other data package contains an address that is not supported by a device to receive or synchronize with the electronic message. If the electronic message or other data package contains only supported addresses, the message may be sent or synchronized as is. If the electronic message or other data package contains an address that is not supported by the device to receive or synchronize with the electronic message, embodiments of the invention may create a supported address corresponding to the non-supported address and replace the non-supported address with the created supported address. The supported address may, for example, comprise a standard internet email address which comprises a local-part, a domain, and (optionally) a display name part.

The local-part of the created standard address may comprise an encoded version of the non-standard address. That is, the local-part may comprise a version of the non-standard address that has been encoded from a binary format into an ASCII string format. The encoding may be performed using any suitable method that produces output that only includes characters that are valid in RFC2822. For example, suitable encoding methods include but are not limited to Base64, Quoted-Printable, or a shared Globally Unique Identifier.

The domain of the created standard address may comprise a (typically predefined) non-valid domain. The non-valid domain should be formatted like a standard, valid domain, such that the mobile device recognizes the address as a standard address (e.g., conforming to RFC2822), but should be an unused internet hostname to avoid potential collisions. A non-valid domain may be a domain that is not present in the domain name system (DNS). The non-valid domain enables the messaging server (or whichever device is performing the conversion) to recognize a converted address such that the converted address can be converted back to the non-standard address and handled appropriately by the messaging server.

It may be desirable to have a portion of the non-valid domain contain some human-readable text, such that a user may recognize that a conversion has been performed and what system performed the conversion. For example, a converted email for Lotus Notes Traveler may use a non-valid domain of "@lotus.notes.traveler.nonascii.substitution" or "@lnt.noninternet.sub."

The display name part of the created standard address may comprise the non-standard address (i.e., a non-encoded version of the non-standard address). This enables the created standard address to retain some user-recognizable correspondence to the original, non-standard address.

Embodiments of the invention may convert the above first example non-standard address öt/ACME to "öt"<w7Z0L0FDTUU=@lnt.noninternet.sub>.

In the created standard address, "öt" is the display name part and comprises the unencoded original non-standard address (this display name part could alternatively use "öt/ACME" which is simply a longer version of the original non-standard address). Further in the created standard address, 'w7Z0L0FDTUU=' is the Base64 encoding of "öt/ACME." As discussed above, Base64 is only one type of encoding method that may be used by embodiments of the invention. Yet further in the created standard address, '@lnt.noninternet.sub' is the non-valid domain that enables the messaging server (or whichever device is performing the conversion) to recognize the converted address such that the converted address can be converted back to the non-standard address.

Embodiments of the invention may convert the above second example non-standard address test user1/ACME@ACME to "test user1"<dGVzdCB1c2VyMS9BQ01FQE-FDTUU=@lnt.noninternet.sub>.

In the created standard address, "test user1" is the display name part and comprises the unencoded original non-standard address (this display name part could alternatively use "test user1/ACME@ACME" which is simply a longer version of the original non-standard address). Further in the created standard address, 'dGVzdCB1c2VyMS9BQ01FQEFDTUU=' is the Base64 encoding of "test user1/ACME@ACME." As above, '@lnt.noninternet.sub' is the non-valid domain that enables the messaging server (or whichever device is performing the conversion) to recognize the converted address such that the converted address can be converted back to the non-standard address.

After the standard address has been created as described above, the non-standard address in the email message is replaced with the created standard address. The email message may then be sent or synchronized to the mobile device.

Embodiments of the invention may encrypt portions of the created standard address, such as the local-part, to prevent data corruption and prevent the users of the mobile device from creating additional, invalid addresses.

When synchronization takes place and a messaging server (or whichever device is performing the conversion) receives data (email, calendar data, contact data, etc.) from a mobile device (or when the server simply receives an email message from the mobile device), the server may determine if the email message contains a standard address that has been converted from a non-standard address. Specifically, the server may determine if the standard address comprises a non-valid domain indicative of a converted non-standard address. If not, the email or data may be processed as-is. If so, the server may convert the standard address back into the non-standard address and replace the standard address in the email message with the non-standard message. The email message may then be handled normally. Converting the standard address into the non-standard address may comprise decoding the local-part, using whichever method was used to encode the local-part initially to create the standard address. The decoded local-part is the original, non-standard address.

As an example, using the above first example non-standard address, a messaging server may receive an email message that included the email address "öt"<w7Z0L0FDTUU=@lnt.noninternet.sub>.

The server may recognize that '@lnt.noninternet.sub' is a non-valid domain and indicates that the address has been converted from a non-standard address. The server may obtain the local-part (w7Z0L0FDTUU=) and decode the local-part using Base64 or whichever method was originally used to encode the local-part. By decoding the local-part, the server may determine that the non-standard address is 'öt/ACME' and may replace the standard address in the email message with this decoded non-standard address.

Figure 2:
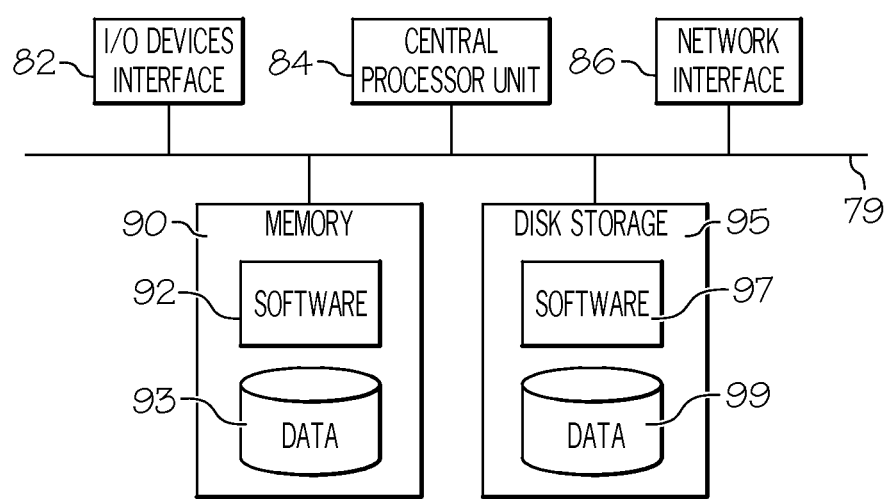
FIG. 2 is a schematic block diagram of a computer in the network of FIG. 1.

FIG. 2 is a diagram of one possible internal structure of a computer (e.g., computer 16) or server (e.g., server 14) in the system of FIG. 1. Each computer typically contains system bus 92, where a bus is a set of hardware lines used for data transfer among the components of a computer. Bus 92 is essentially a shared conduit that connects different elements of a computer system (e.g., processor, disk storage, memory, input/output ports, network ports, etc.) that enables the transfer of information between the elements. Attached to system bus 92 is I/O device interface 96 for connecting various input and output devices (e.g., displays, printers, speakers, microphones, etc.) to the computer. Alternatively, the I/O devices may be connected via one or more I/O processors attached to system bus 92. Network interface 100 allows the computer to connect to various other devices attached to a network (e.g., network 10 of FIG. 1). Memory 80 provides volatile storage for computer software instructions 82 and data 84 used to implement an embodiment of the present invention. Disk storage 86 provides non-volatile storage for computer software instructions 88 and data 90 used to implement an embodiment of the present invention. Central processor unit 98 is also attached to system bus 92 and provides for the execution of computer instructions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. If the service is also available to applications as a REST interface, then launching applications could use a scripting language like JavaScript to access the REST interface. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

"Computer" or "computing device" broadly refers to any kind of device which receives input data, processes that data through computer instructions in a program, and generates output data. Such computer can be a hand-held device, laptop or notebook computer, desktop computer, minicomputer, mainframe, server, cell phone, personal digital assistant, other device, or any combination thereof.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

That which is claimed:

1. A system for dynamic encoding of email addresses comprising:
   a processor configured for (a) determining if a data package contains an address that is not supported by a device to receive or synchronize with the data package; (b) if the data package contains an address that is not supported by the device to receive or synchronize with the data package, creating a supported address corresponding to the non-supported address, the supported address comprising a local-part and a domain, the local-part comprising an encoded version of the entire non-supported address, the domain comprising a non-valid domain; and (c) replacing the non-supported address in the data package with the created supported address.

2. The system of claim 1, wherein the created supported address further comprises a display name part containing a non-encoded version of the non-supported address.

3. The system of claim 1, wherein the non-valid domain comprises a domain that is not present in a domain name system.

4. A computer program product for dynamic encoding of email addresses, the computer program product comprising a non-transitory computer readable storage medium having computer readable program code embodied therewith, the computer readable program code comprising:
   computer readable program code configured for determining if a data package contains an address that is not supported by a device to receive or synchronize with the data package;
   computer readable program code configured for, if the data package contains an address that is not supported by the device to receive or synchronize with the data package, creating a supported address corresponding to the non-supported address, the supported address comprising a local-part and a domain, the local-part comprising an encoded version of the entire non-supported address, the domain comprising a non-valid domain; and
   computer readable program code configured for replacing the non-supported address in the data package with the created supported address.

5. The computer program product of claim 4, wherein the created supported address further comprises a display name part containing a non-encoded version of the non-supported address.

6. The computer program product of claim 4, wherein the non-valid domain comprises a domain that is not present in a domain name system.

7. A system for dynamic decoding of email addresses comprising: a processor configured for (a) receiving a data package from a device; (b) determining if the data package comprises an address supported by the device that has been converted from an address that is not supported by the device, the supported address comprising a local-part and a domain, the local part comprising an encoded version of the entire non-supported address; (c) converting the supported address into the non-supported address; and (d) replacing the supported address in the data package with the non-supported message.

8. The system of claim 7, wherein determining if the data package comprises a supported address that has been converted from a non-supported address comprises determining if the supported address comprises a non-valid domain indicative of a converted non-supported address.

9. The system of claim 7, wherein converting the supported address into the non-supported address comprises decoding the local-part.

10. A computer program product for dynamic encoding of email addresses, the computer program product comprising a non-transitory computer readable storage medium having computer readable program code embodied therewith, the computer readable program code comprising:

computer readable program code configured for receiving a data package from a device;

computer readable program code configured for determining if the data package comprises an address supported by the device that has been converted from an address that is not supported by the device, the supported address comprising a local-part and a domain, the local part comprising an encoded version of the entire non-supported address;

computer readable program code configured for converting the supported address into the non-supported address; and computer readable program code configured for replacing the supported address in the data package with the non-supported message.

11. The computer program product of claim 10, wherein determining if the data package comprises a supported address that has been converted from a non-supported address comprises determining if the supported address comprises a non-valid domain indicative of a converted non-supported address.

12. The computer program product of claim 10, wherein converting the supported address into the non-supported address comprises decoding the local-part.

* * * * *